(12) United States Patent
Schorpp et al.

(10) Patent No.: US 7,376,299 B2
(45) Date of Patent: May 20, 2008

(54) OPTICAL BI-DIRECTIONAL ROTARY HINGE

(75) Inventors: Marcus Schorpp, Lempäälä (FI); Ari Tervonen, Vantaa (FI)

(73) Assignee: Nokia Corporation (FI)

( * ) Notice: Subject to any disclaimer, the term of this patent is extended or adjusted under 35 U.S.C. 154(b) by 0 days.

(21) Appl. No.: 11/313,219

(22) Filed: Dec. 19, 2005

(65) Prior Publication Data

US 2007/0140620 A1    Jun. 21, 2007

(51) Int. Cl.
*G02B 6/26* (2006.01)

(52) U.S. Cl. .............................. 385/25; 385/31; 385/47

(58) Field of Classification Search ................ 385/25, 385/26, 31, 47, 146
See application file for complete search history.

(56) References Cited

U.S. PATENT DOCUMENTS

| | | | |
|---|---|---|---|
| 4,786,136 A | 11/1988 | Cannon | |
| 5,392,370 A | 2/1995 | Gryk | |
| 5,425,117 A | 6/1995 | Miesak | |
| 5,450,512 A * | 9/1995 | Asakura | ........... 385/48 |
| 5,535,294 A | 7/1996 | Kamuz et al. | |
| 6,353,693 B1 | 3/2002 | Kano et al. | |
| 6,470,132 B1 * | 10/2002 | Nousiainen et al. | ........ 385/146 |
| 7,184,617 B2 * | 2/2007 | Korenaga et al. | ............ 385/14 |
| 2004/0223689 A1 | 11/2004 | Lempkowski et al. | |
| 2005/0063709 A1 | 3/2005 | Poisel et al. | |
| 2005/0069249 A1 | 3/2005 | Lo et al. | |
| 2005/0069250 A1 | 3/2005 | Guy | |
| 2007/0032275 A1 | 2/2007 | Suzuki et al. | |

FOREIGN PATENT DOCUMENTS

| | | |
|---|---|---|
| DK | DE 8905655 U1 | 8/1989 |
| WO | WO 0221730 A2 | 3/2002 |

* cited by examiner

*Primary Examiner*—Frank G. Font
*Assistant Examiner*—Charlie Peng

(57) ABSTRACT

The specification and drawings present a new method and apparatus for a rotary hinge for transmitting an optical signal (e.g., comprising data) bi-directionally or uni-directionally from one part to another in an electronic device, wherein these parts can rotate relative to each other using the rotary hinge. The optical signal can be transferred from one side to the other side of the hinge independently from light transmitted in the opposite direction. A sending guiding element (e.g., an optical fiber or a light guide) can rotate around a common rotation axis permanently attached to the side sending the optical signal and the emitted optical beam is directed towards the common rotation axis. The receiving guiding element, which collects the optical beam, is concentrically in the center (coinciding with the common rotation axis) of the receiving side and permanently attached to it.

32 Claims, 8 Drawing Sheets

OPTICAL BI-DIRECTIONAL ROTARY HINGE

TECHNICAL FIELD

The present invention relates generally to opto-electronic bi-directional transmission and, more specifically, to two-channel optical transmission through a rotary hinge.

BACKGROUND ART

Transmitting an optical signal (e.g., bi-directional data transmission) through a rotary hinge is not an easy task, since uninterrupted optical fibers cannot be used.

A similar problem can be also found in hinges limited in its turning feature, e.g., to a range +/−180° hinges. In this case, in principle, one can lead optical fibers through the hinge, but then the durability of the optical fibers will be limited.

Bi-directional optical signal transmission is preferable for many practical applications, e.g., in mobile phones, where high-speed data transfer in two directions is required, e.g., where a display and a camera are located in the upper part of the phone and the image handling chip(s) are located in the lower part.

DISCLOSURE OF THE INVENTION

According to a first aspect of the invention, a rotary hinge for transmitting an optical signal, comprises: a first hinge part of the rotary hinge; a second hinge part of the rotary hinge, wherein the first and second hinge parts, being complimentary, have one common rotation axis and can rotate relative to each other in a predefined angular range or without any angular limitation; at least one sending optical guiding element permanently attached to the first or the second hinge part off-axis of the common rotation axis, so the at least one sending optical guiding element can rotate around the common rotation axis, wherein an optical beam comprising the optical signal may be directed by the at least one sending optical guiding element substantially towards the common rotation axis; and at least one receiving optical guiding element, permanently attached to a complimentary hinge part, the second or the first hinge part, respectively, wherein an optical axis of the at least one receiving optical guiding element coincides with the common rotation axis, wherein the optical beam comprising the optical signal may be coupled from the at least one sending optical guiding element to the at least one receiving optical guiding element using a predetermined coupling mechanism with substantially the same loss for any angular position of the first and the second hinge parts relative to each other.

According further to the first aspect of the invention, the rotary hinge for transmitting an optical signal may provide a bi-directional optical transmission through the rotary hinge, if the rotary hinge comprises more than one of the at least one sending optical guiding element and more than one of the at least one receiving optical guiding element.

Further according to the first aspect of the invention, the predefined angular range may be from zero to an angle α, wherein $0 < \alpha \leq 360°$.

Still further according to the first aspect of the invention, the at least one sending optical guiding element may be a sending optical fiber. Further, the optical beam comprising the optical signal may be coupled out of the sending optical fiber towards the common rotation axis through an angled-cut out-coupling facet of the sending optical fiber, such that the out-coupling facet of the sending optical fiber is not perpendicular to a longitudinal axis of the sending optical fiber; wherein the out-coupling is performed: a) by refraction on a fiber-air interface using a total internal refraction, or b) by a reflecting mirror deposited on the angled-cut out-coupling facet. Further still, an angle between a perpendicular to the angled-cut out-coupling facet and the longitudinal axis of the sending optical fiber may be substantially between 45 and 70 degrees. Yet still further, the longitudinal axis of the sending optical fiber may be parallel to the common rotation axis.

According further to the first aspect of the invention, the sending optical fiber may be bent towards the common rotation axis in order to direct the optical beam comprising the optical signal towards the common rotation axis.

According still further to the first aspect of the invention, an optical index matching fluid may be used to fill an air gap between the at least one sending optical guiding element and the at least one receiving optical guiding element to minimize an air-interface reflection on coupling facets of the optical guiding elements.

According further still to the first aspect of the invention, the at least one receiving optical guiding element may be a receiving optical fiber.

According yet further still to the first aspect of the invention, the optical beam may be collected by the at least one receiving optical guiding element using an in-coupling facet of the at least one receiving optical guiding element implemented as one of the following: a) a lens; b) a flat surface; c) a conical or curved surface; and d) a reverse conical or curved surface.

Yet still further according to the first aspect of the invention, the optical beam may be coupled out by the at least one sending optical guiding element using one of the following: a) an angled-cut out-coupling facet of the at least one sending optical guiding element; b) bending the at least one sending optical guiding element towards the common rotation axis in order to direct the beam towards the common rotation axis; and c) forming a curved mirror surface or a lensed surface on an out-coupling facet of the at least one sending optical guiding element.

Still yet further according to the first aspect of the invention, a coupling facet of the at least one receiving optical guiding element or the at least one sending optical guiding element may be coated with an antireflection coating for reducing reflection losses.

Still further still according to the first aspect of the invention, the at least one sending optical guiding element or the at least one receiving optical guiding element may be a light guide.

Yet still further still according to the first aspect of the invention, the optical signal may comprise at least one of: optical data; and visible, infrared or ultraviolet light for illumination According to a second aspect of the invention, an optical signal through a rotary hinge, wherein the hinge may comprise a first hinge part and a second hinge part, wherein the first and second hinge parts, being complimentary, have one common rotation axis and can rotate relative to each other in a predefined angular range or without any angular limitation, the method comprises the steps of: coupling the optical signal into at least one sending optical guiding element, wherein at least one sending optical guiding element is permanently attached to the first or the second hinge part off-axis of the common rotation axis, so the at least one sending optical guiding element can rotate around the common rotation axis; coupling an optical beam comprising the optical signal out of the at least one sending optical guiding element, such that the optical beam is directed by the at least one sending optical guiding element substantially towards the common rotation axis; and collecting the optical beam comprising the optical signal coupled out of the at least one sending optical guiding element by the at least one receiving optical guiding element using a predetermined coupling mechanism with substantially the same loss for any angular position of the first and the second hinge parts relative to each other, wherein the at least one receiving optical guiding element is permanently attached to a complimentary hinge part, the second or the first hinge part, respectively, and an optical axis of the at least one receiving optical guiding element coincides with the common rotation axis.

According further to the second aspect of the invention, the predefined angular range may be from zero to an angle $\alpha$, wherein $0<\alpha\leq 360°$.

Further according to the second aspect of the invention, at least one sending or receiving optical guiding element may be an optical fiber or a light guide.

Still further according to the second aspect of the invention, an optical index matching fluid may be used to fill an air gap between the at least one sending optical guiding element and the at least one receiving optical guiding element to minimize an air-interface reflection on coupling facets of the optical guiding elements.

According further to the second aspect of the invention, the optical beam may be collected by the at least one receiving optical guiding element using an in-coupling facet of the at least one receiving optical guiding element implemented as one of the following: a) a lens; b) a flat surface; c) a conical or curved surface; and d) a reverse conical or curved surface.

According still further to the second aspect of the invention, the optical beam may be coupled out by the at least one sending optical guiding element using one of the following: a) an angled-cut out-coupling facet of the at least one sending optical guiding element; b) bending the at least one sending optical guiding element towards the common rotation axis in order to direct the beam towards the common rotation axis; and c) forming a curved mirror surface or a lensed surface on an out-coupling facet of the at least one sending optical guiding element.

According further still to the second aspect of the invention, a coupling facet of the at least one receiving optical guiding element or the at least one sending optical guiding element may be coated with an antireflection coating for reducing reflection losses.

According yet further still to the second aspect of the invention, the optical signal may comprise at least one of: optical data; and visible, infrared or ultraviolet light for illumination.

According to a third aspect of the invention, an electronic device, comprises: a first part; a second part; at least one light source incorporated in the first or the second part of the electronic device, for providing an optical signal; a rotary hinge for transmitting the optical signal, which comprises: a first hinge part of the rotary hinge attached to the first part of the electronic device; a second hinge part of the rotary hinge attached to the second part of the electronic device, wherein the first and second hinge parts, and therefore the first and the second part of the electronic device, being complimentary, have one common rotation axis and can rotate relative to each other in a predefined angular range or without an angular limitation; at least one sending optical guiding element permanently attached to the first or the second hinge part off-axis of the common rotation axis, so the at least one sending optical guiding element can rotate around the common rotation axis, wherein the optical signal is coupled to the at least one sending optical guiding element and then an optical beam comprising the optical signal is directed by the at least one sending optical guiding element substantially towards the common rotation axis; and at least one receiving optical guiding element, permanently attached to a complimentary hinge part, the second or the first hinge part, respectively, wherein an optical axis of the at least one receiving optical guiding element coincides with the common rotation axis, wherein the optical beam comprising the optical signal is coupled from the at least one sending optical guiding element to the at least one receiving optical guiding element using a predetermined coupling mechanism with substantially the same loss for any angular position of the first and the second hinge parts relative to each other.

According further to the third aspect of the invention, the electronic device may be a camera, a camera-phone, a wireless device, a portable electronic device, a mobile terminal or a mobile phone.

Further according to the third aspect of the invention, the predefined angular range may be from zero to an angle $\alpha$, wherein $0<\alpha\leq 360°$.

Still further according to the third aspect of the invention, the at least one sending or receiving optical guiding element may be an optical fiber or a light guide.

According further to the third aspect of the invention, the optical beam may be collected by the at least one receiving optical guiding element using an in-coupling facet of the at least one receiving optical guiding element implemented as one of the following: a) a lens; b) a flat surface; c) a conical or curved surface; and d) a reverse conical or curved surface.

According still further to the third aspect of the invention, the optical beam may be coupled out by the at least one sending optical guiding element using one of the following: a) an angled-cut out-coupling facet of the at least one sending optical guiding element; b) bending the at least one sending optical guiding element towards the common rotation axis in order to direct the beam towards the common rotation axis; and c) forming a curved mirror surface or a lensed surface on an out-coupling facet of the at least one sending optical guiding element.

According yet further still to the third aspect of the invention, the optical signal may comprise at least one of: optical data; and visible, infrared or ultraviolet light for illumination.

BEST MODE FOR CARRYING OUT THE INVENTION

Figure 1:
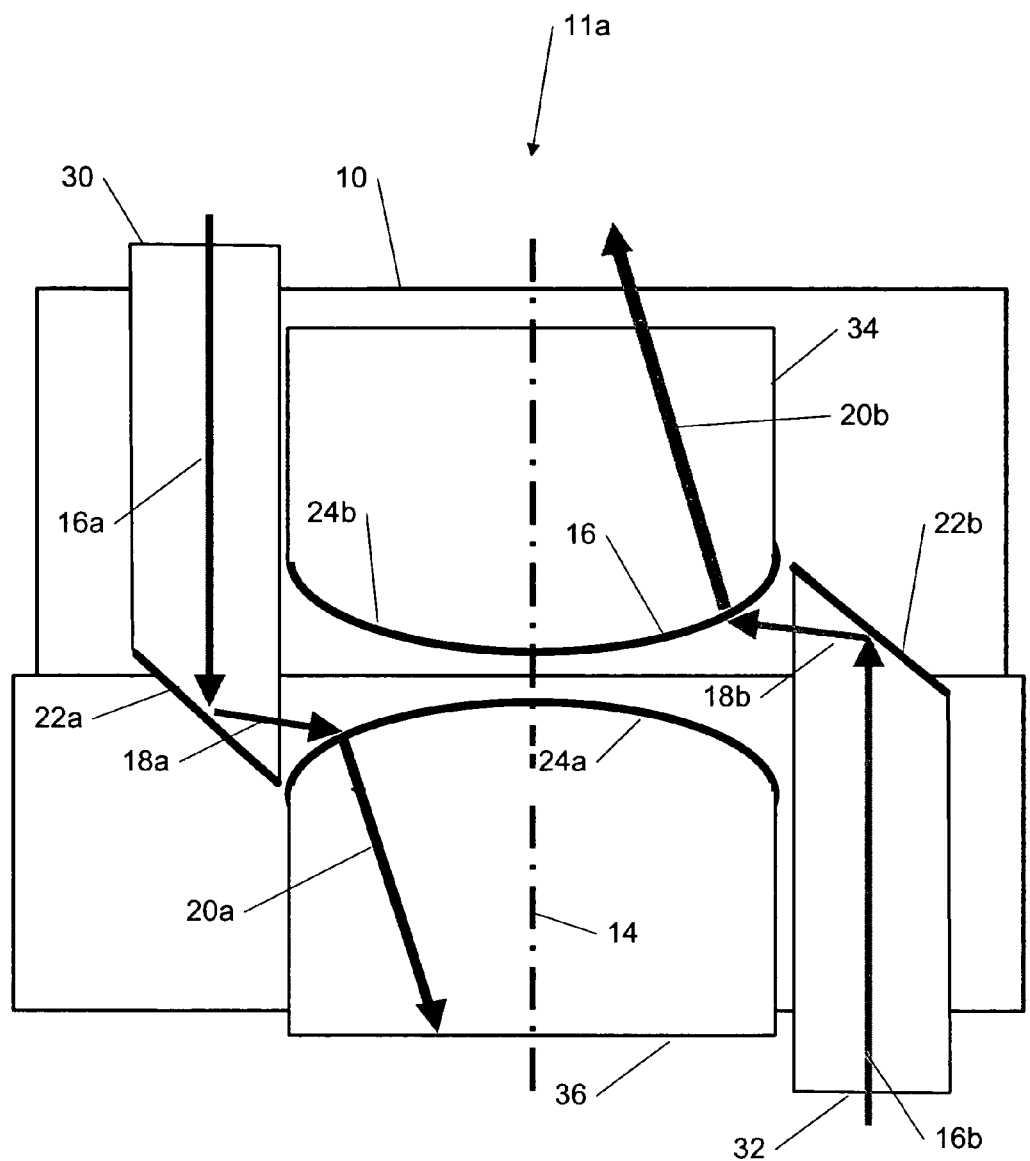
FIG. 1 is a schematic representation of the optical rotary hinge implementation with a lensed receiving optical fiber, according to an embodiment of the present invention.

A new apparatus and method for a rotary hinge for transmitting an optical signal bi-directionally or uni-directionally from one part to another in an electronic device, wherein these parts can rotate relative to each other using the rotary hinge. The optical signal can be transferred from one side to the other side of the hinge independently from light transmitted in the other direction. The hinge can be rotated without angular limitation if no other means (e.g. electrical cables) hinder that. The electronic device can be (but is not limited to) a camera, a camera-phone, a wireless device, a portable electronic device, a mobile terminal, a mobile phone, etc.

The rotary hinge comprises a first hinge part which is rigidly connected to a first part of the electronic device and a second hinge part which is rigidly connected to a second part of the electronic device, wherein said first and second hinge parts, and therefore the first and the second parts of the electronic device, being complimentary, have one common rotation axis and can rotate relative to each other in a predefined angular range or without any angular limitation. Then, according to an embodiment of the present invention, a method for transmitting an optical signal through a rotary hinge comprises of steps as described below.

First, the optical signal is coupled into at least one (meaning it could be one or more) sending optical guiding element, wherein this guiding element is permanently attached to the first or the second hinge part off-axis of the common rotation axis, so the at least one sending optical guiding element can rotate around the common rotation axis. The optical signal is provided by at least one light source (e.g., a laser or an LED) incorporated in the first or the second part, respectively, of the electronic device. Further, according to embodiments of the present invention, the predefined angular range can be from zero to an angle α, wherein 0<α≦360° or the angular range can be unlimited (i.e., the first and the parts of the electronic device can freely rotate relative to each other without any angular limitation).

Second, the optical beam comprising the optical signal is coupled out of the at least one sending optical guiding element, such that the optical beam is directed by the at least one sending optical guiding element substantially towards the common rotation axis using, for example, a) an angled-cut out-coupling facet of the at least one sending optical guiding element; b) bending the at least one sending optical guiding element towards the common rotation axis in order to direct said beam towards the common rotation axis, or c) forming a curved mirror surface or a lensed surface on an out-coupling facet of the at least one sending optical guiding element.

Then, the optical beam, comprising the optical signal and coupled out of the at least one sending optical guiding element, is collected by the at least one receiving optical guiding element using a predetermined coupling mechanism with substantially the same loss for any angular position of the first and the second hinge parts relative to each other in the predefined angular range (or at any rotation position without an angular limitation), wherein the at least one receiving optical guiding element is permanently attached to a complimentary hinge part, the second or the first hinge part, respectively, and an optical axis of the at least one receiving optical guiding element coincides with the common rotation axis. According to embodiments of the present invention, the optical beam can be collected by the at least one receiving optical guiding element using an in-coupling facet of the at least one receiving optical guiding element implemented as (but not limited to) one of the following: a) a lens; b) a flat surface; c) a conical or, in general, curved surface; d) a reverse conical or, in general, curved surface, etc.

Furthermore, according to embodiments of the present invention, the at least one sending optical guiding element and/or the at least one receiving optical guiding element can be, for example, an optical fiber or a light guide (e.g., a fiber bundle). Moreover, an optical index matching fluid can be used to fill an air gap between the at least one sending optical guiding element and the at least one receiving optical guiding element to minimize an air-interface reflection on coupling facets of the optical guiding elements and potentially reduce crosstalk between two optical channels, depending on the optical design. Still further, an in/out-coupling facet of the at least one receiving or sending optical guiding element can be coated with an antireflection coating for reducing reflection losses. Furthermore the outcoupling facet of the sending fiber can form a curved surface, working as a curved mirror or a lens (see examples of FIGS. 3b and 5b below) focusing the out coupled light to a small spot, which can make the coupling more efficient and/or reduce the size (i.e., reducing the core diameter) of the receiving fiber which can allow a faster data transmission. Still yet further, the optical signal can comprise optical data (e.g., transmitted through an optical fiber) and/or light (e.g., visible, infrared, ultra-violet, etc.) for illumination (e.g., transmitted through the light guide such as the fiber bundle).

One example of the electronic device utilizing the rotary hinge for transmitting the optical signal as described by embodiments of the present invention is a multipart mobile phone with high-resolution camera and display(s) in the top part and the picture processing chip in the bottom part, requiring high-speed data transmission through the hinge in both directions, from the upper part (the camera) to the bottom part, where the data is handled and from the bottom part to the upper part (to the display).

It is noted that if the light source generates a rather narrow beam, rather high coupling efficiencies can be expected, especially when reflection is used for in and out coupling and the air-gaps are filled with the index matching fluid. For the light sources with larger emitting angles it is more difficult to confine the light in the receiving optical guiding element (e.g., the optical fiber). Moreover, the optical channels can be also used for transmission of visible light, possibly at the same time as data transmission. The information could be modulated using visible light or it could be transmitted using infrared in parallel with the visible light. The visible light could be used, e.g., for illuminating a display backlight diffuser.

FIGS. 1-6 show examples demonstrating different embodiments of the present invention. FIG. 1 shows an example among others of a schematic representation of the optical rotary hinge 11a implemented using lensed receiving optical fibers 36 and 34 (corresponding to the at least one receiving optical guiding elements recited above), according to an embodiment of the present invention. First, the optical beam 16a or 16b comprising the optical signal, is coupled into the sending optical fiber 30 or 32 (corresponding to the at least one sending optical guiding element recited above), respectively.

The optical beam 18a or 18b is coupled out of said sending optical fiber 30 or 32 towards the common rotation axis 14 through an angled-cut out-coupling facet 22a or 22b of the sending optical fiber 30 or 32, such that the out-coupling facet of the sending optical fibers 30 and 32 is not perpendicular to a longitudinal axis of the sending optical fibers 30 and 32; wherein said out-coupling is performed: a) by refraction on a fiber-air interface using a total internal refraction, or b) by a reflecting mirror deposited on the angled-cut out-coupling facets 22a and 22b (thus minimizing losses due to stray angles of the optical beam where the total internal reflection may be frustrated without the mirror). Typically, an angle between a perpendicular to the angled-cut out-coupling facet 22a and 22b and the longitudinal axis of the sending optical fibers 30 and 32 can be, e.g., in a range of 45-70 degrees or further beyond this range. The optimum angle can be determined by specific design requirements. Also, the longitudinal axis of the sending optical fibers 30 and 32 is with parallel to the common rotation axis in FIG. 1. Finally, the optical beam 18a or 18b is collected by a lens 24a or 24b of the receiving optical fiber 36 or 34. The lenses (24a and 24b) increase an acceptance angle of the receiving optical fibers 36 and 34 and, therefore, enables a less restrictive optical design. It is noted that lenses 24a or 24b can be coated by an antireflection coating to minimize reflection losses and potentially reduce crosstalk between the two optical channels.

Figure 2:
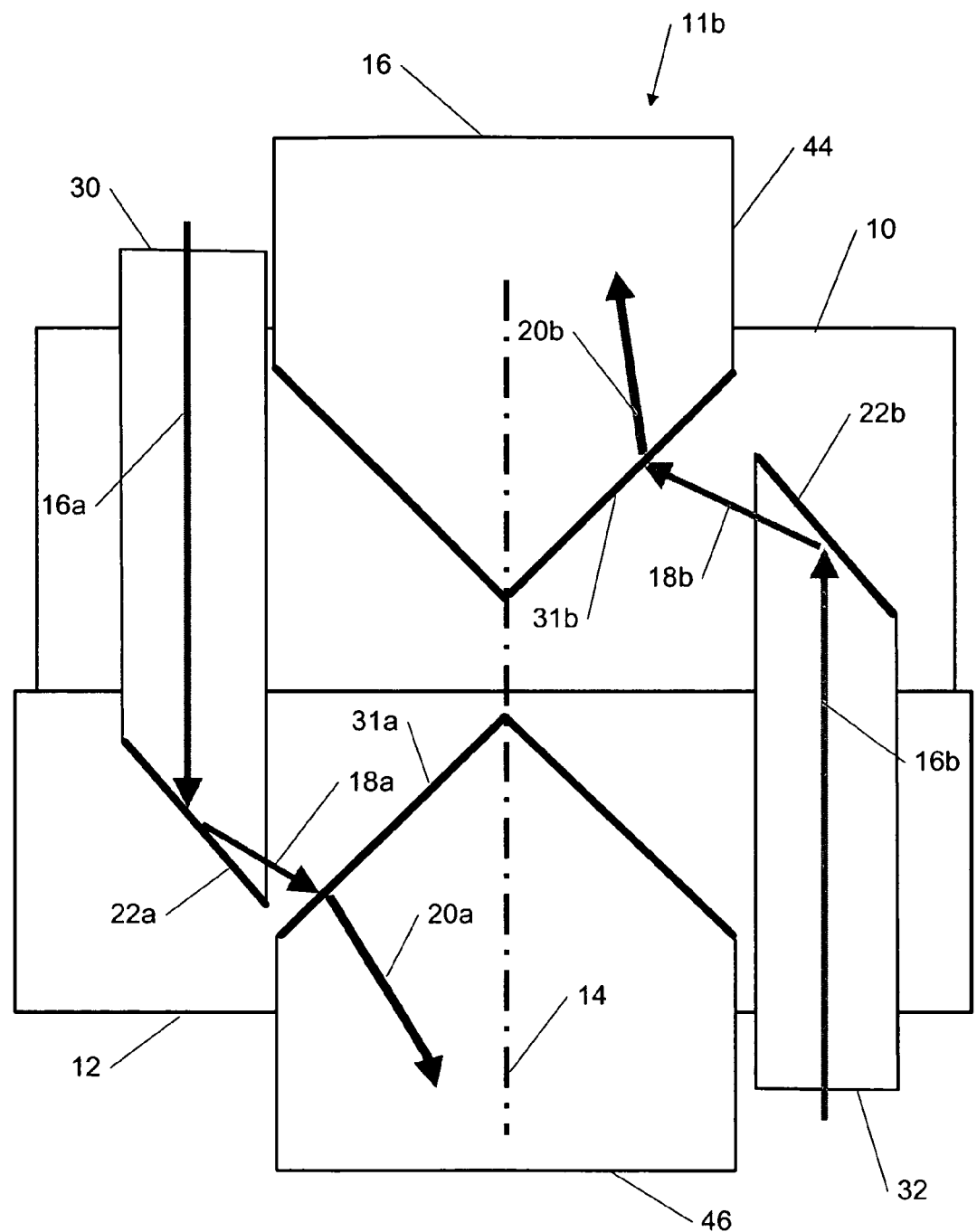
FIG. 2 is a schematic representation of the optical rotary hinge implementation with a cone headed (conical surface) receiving optical fiber, according to an embodiment of the present invention.

FIG. 2 shows an example among others of a schematic representation of the optical rotary hinge 11b implementation with a cone headed (having a conical surface) receiving optical fibers (or generally the receiving optical guiding elements) 46 and 44, according to an embodiment of the present invention. The difference with FIG. 1 is that the receiving optical fibers 46 and 44 (also it can be a light guide) has an end forming a cone, such that the optical beam is refracted on the air-fiber interface when entering the receiving optical fibers 46 and 44 as shown in FIG. 2. In addition, cone surfaces 31a and 31b can be coated by the antireflection coating to minimize reflection losses and potentially reduce crosstalk between the two optical channels.

It is noted that, according to an embodiment of the present invention, the surfaces 31a and 31b can have not only a conical shape but, in general, a curved shape which can be determined by the specific design requirements.

Figure 3A:
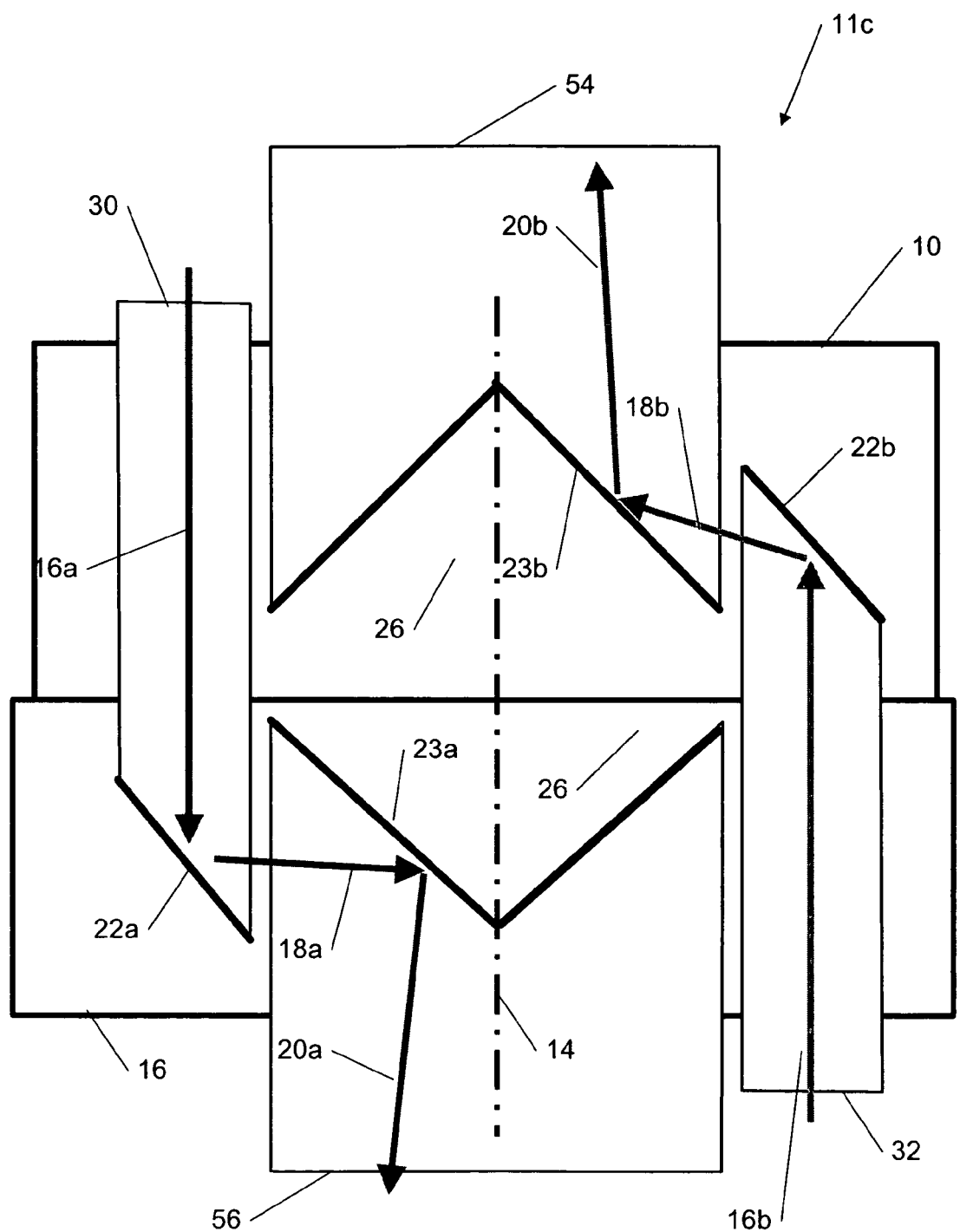
FIG. 3a is a schematic representation of the optical rotary hinge implementation with a cone drilled (reversed conical surface) receiving optical fiber, according to an embodiment of the present invention.

FIG. 3a shows another example among others of a schematic representation of the optical rotary hinge 11c implementation, similar to the one shown in FIG. 2, but with a cone drilled (reversed conical surface) receiving optical fibers (or generally the receiving optical guiding elements) 56 and 54, according to an embodiment of the present invention. The difference with FIG. 1 is that the receiving optical fibers 56 and 54 (also can be light guides) have ends forming a cone such that the optical beam 18a or 18b is reflected on the air-fiber interface (by the total internal reflection) on the cone surfaces 23a or 23b when entered the receiving optical fiber 56 or 54 as shown in FIG. 3. In addition, the cone surfaces 23a and 23b and/or the angled-cut out-coupling facets 22a and 22b can be coated with high reflection mirrors (typically, using metallic coatings).

Still further, if the cone surfaces 22a and 22b and/or the angled-cut out-coupling facets 22a and 22b are coated by the high reflection mirrors, the optical index matching fluid 26 can be used to fill an air gap between the elements 30 and 56, and 32 and 54 such that, when the optical beam 18a or 18b enters on a side facet of the element 56 or 54, respectively, it will further minimize an air-interface reflection on the side facets of the elements 56 and 54. Therefore, implementation of FIG. 3a may have an advantage from optical coupling efficiency point of view and possibility of minimization of reflection losses and potentially reducing crosstalk between the two optical channels.

As noted above, according to the embodiment of the present invention, the surfaces 23a and 23b can have not only a conical shape but, in general, a curved shape which can be determined by the specific design requirements.

Figure 3B:
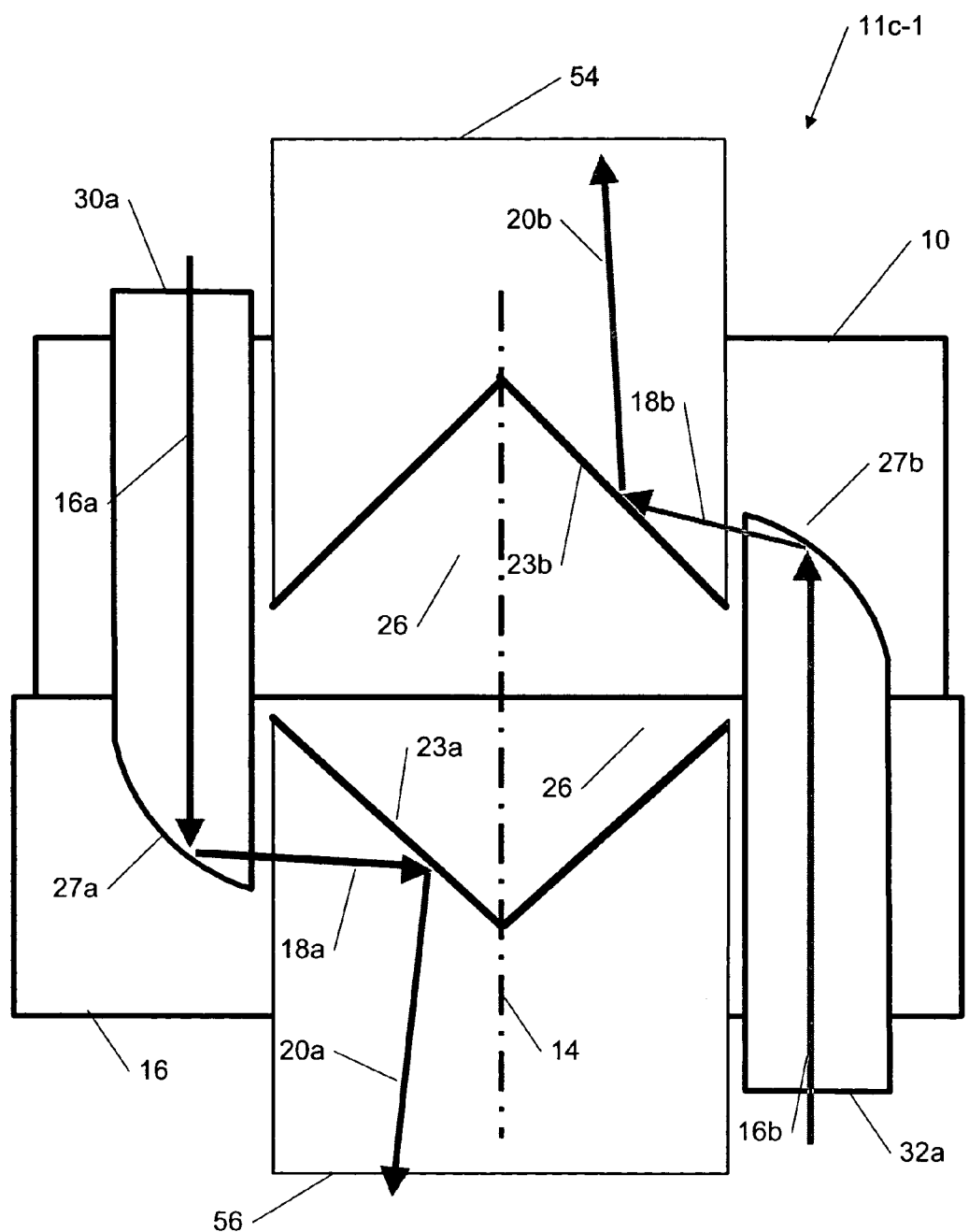
FIG. 3b is another schematic representation of the optical rotary hinge implementation with a cone drilled (reversed conical surface) receiving optical fiber and with an out-coupling facet of the sending fiber forming a curved mirror surface, according to an embodiment of the present invention.

FIG. 3b shows another example among others of a schematic representation of the optical rotary hinge 11c-1 implementation with cone drilled (reversed conical surface) receiving optical fibers 56 and 54, similar to the one shown in FIG. 3a, but with an out-coupling facet of the sending optical fibers 30a and 32a forming a curved mirror surface 27a and 27b, (the surfaces 27a and 27b can be also coated with high reflection mirror coatings as described above), according to an embodiment of the present invention. This allows to focus the out-coupled optical beam 18a or 18b to a small spot, which can make the coupling more efficient and/or reduce the size (i.e., reducing the core diameter) of the receiving optical fiber 56 or 54, respectively, which can allow a faster data transmission through the hinge 11c-1.

It is note that according to an embodiment of the present invention, the concept of the curved mirrors 27a and 27b formed on the out-coupling facet of the sending optical fibers 32a and 32b shown in FIG. 3b can be also used in the configuration shown in FIGS. 1 and 2 with the same benefit of making the coupling more efficient and/or reducing the size (i.e., reducing the core diameter) of the receiving optical fibers 36 and 34, and 46 and 44, respectively, in FIGS. 1 and 2.

Figure 4:
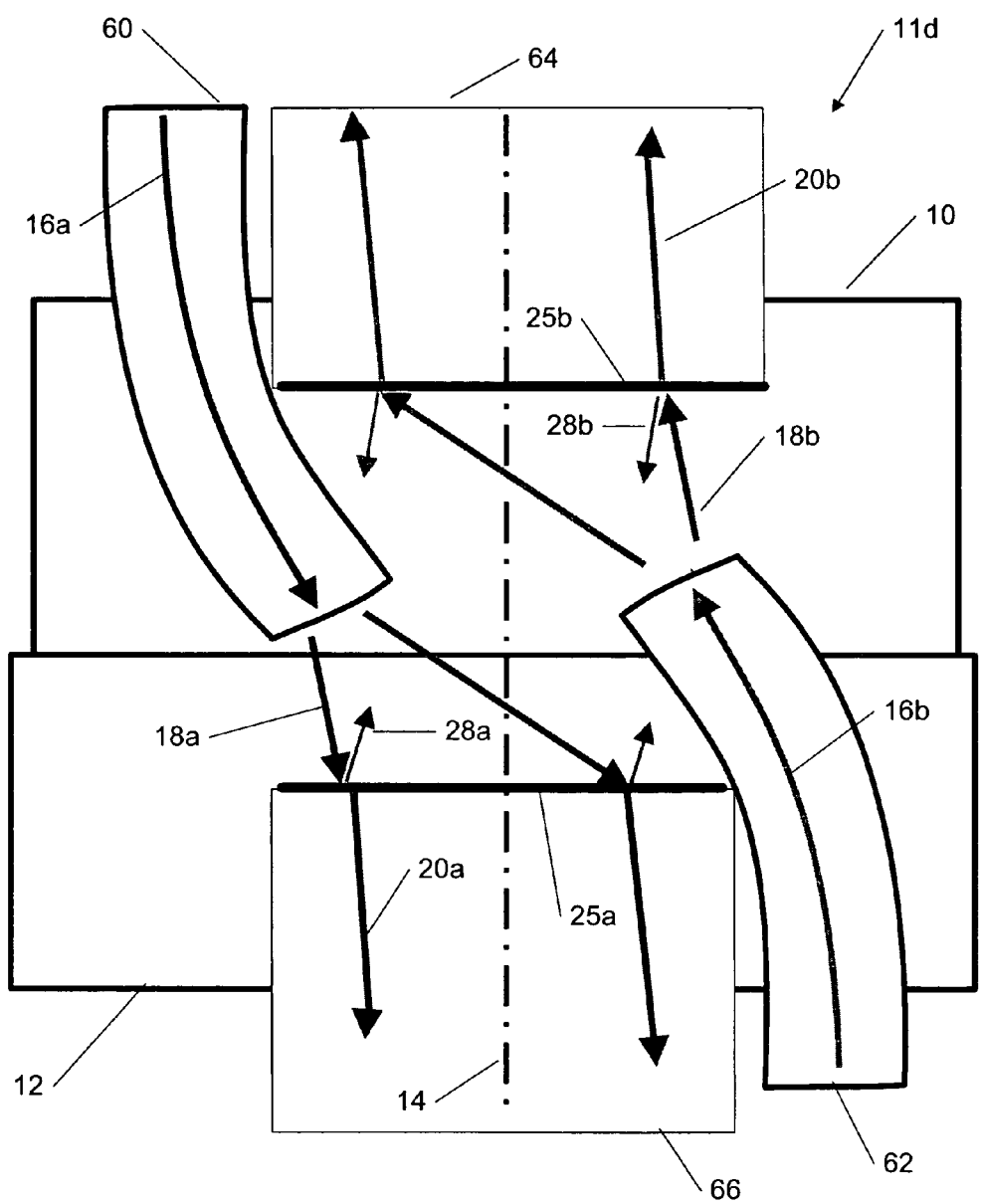
FIG. 4 is a schematic representation of the optical rotary hinge implementation without reflecting surfaces but with direct view coupling, according to an embodiment of the present invention.

FIG. 4 shows a further example among others of a schematic representation of the optical rotary hinge 11d implementation without reflecting or refracting surfaces but with a "direct view" coupling, according to an embodiment of the present invention. The sending optical fibers (or generally the sending optical guiding elements) 60 and 62 having straight cut ends are slightly and permanently bent (as shown in FIG. 4) towards the common rotation axis 14 such that the optical beam 18a or 18b is directly coupled to the receiving optical fiber 66 or 64 also having a straight cut ends. In order to minimize reflected beams 28a and 28b, surfaces 25a and 25b can be coated by the antireflection coating as shown in FIG. 4. Still further, the optical index matching fluid 26 can be used (e.g., instead of using antireflection coatings on the surfaces 25a and 25b) to fill an air gap between the elements 60 and 66, and 62 and 64 such that, when the optical beam 18a or 18b enters the element 66 or 64, respectively, it will further minimize an air-interface reflection on coupling facets 25a and 25b of the optical guiding elements (e.g., the receiving optical fibers) 66 and 64.

Figure 5A:
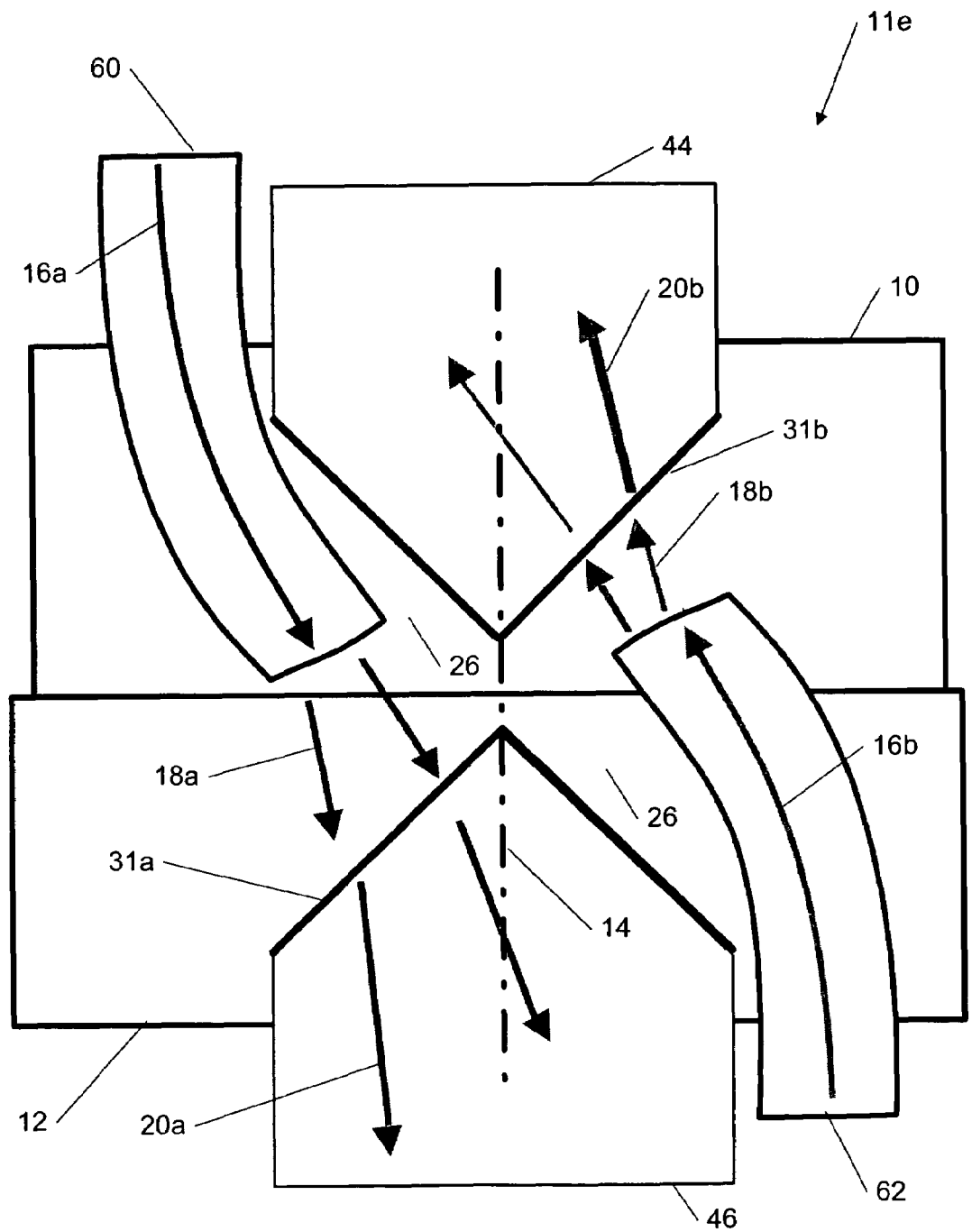
FIG. 5a is another schematic representation of the optical rotary hinge implementation without reflecting surfaces but with direct view coupling and cone headed receiving fiber, according to an embodiment of the present invention.

FIG. 5a shows another example among others of a schematic representation of the optical rotary hinge 11e implementation without reflecting surfaces but with the "direct view" coupling, according to an embodiment of the present invention. The difference with FIG. 4 is in implementation of the receiving optical elements. Here, instead of receiving optical fibers (or generally the receiving optical guiding elements) 66 and 64, the cone headed (having a conical surface) receiving optical fibers 46 and 44 are used as described in regard to the example of FIG. 2. As described above, the cone surfaces 31a and 31b can be coated by the antireflection coating to minimize reflection losses and potentially reduce crosstalk between the two optical channels. Also, the optical index matching fluid 26 can be used to fill an air gap between the elements 60 and 46, and 62 and 44 or, alternatively, antireflection coatings may be used such that, when the optical beam 18a or 18b enters element 46 or 44, respectively, it will further minimize the air-interface reflection on coupling facets 31a and 31a of the optical guiding elements (e.g., receiving optical fibers) 46 and 44. As noted above, according to the embodiment of the present invention, the surfaces 31a and 31b can have not only a conical shape but, in general, a curved shape which can be determined by the specific design requirements.

Figure 5B:
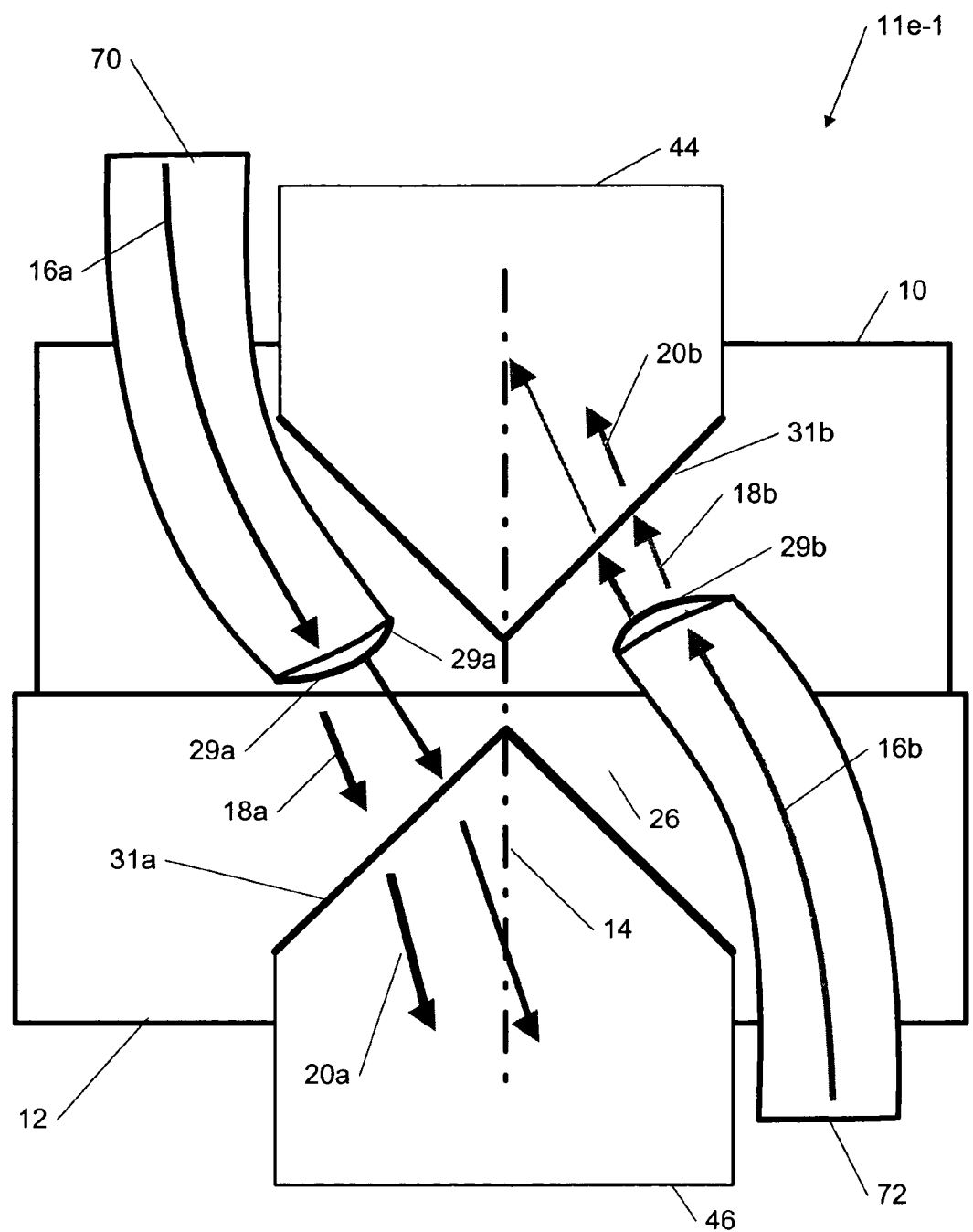
FIG. 5b is still another schematic representation of the optical rotary hinge implementation without reflecting surfaces but with direct view coupling and cone headed receiving fiber and with an out-coupling facet of the sending fiber forming a curved lens surface, according to an embodiment of the present invention.

FIG. 5b shows still another example among others of a schematic representation of the optical rotary hinge 11e-1 implementation without reflecting surfaces but with the "direct view" coupling and with an out-coupling facet of the sending optical fiber 70 or 72 forming a curved lens surface 29a or 29b, respectively, according to an embodiment of the present invention.

The curved lens surface 29a or 29b allows to focus the out-coupled optical beam 18a or 18b to a small spot, which can make the coupling more efficient and/or reduce the size (i.e., reducing the core diameter) of the receiving optical fiber 46 or 44, respectively, which can allow a faster data transmission through the hinge 11c-1.

It is noted that according to an embodiment of the present invention, the concept of lensed sending optical fibers 70 and 72 shown in FIG. 5b can be also used in the configuration shown in FIG. 4 (adding curved lensed surfaces in sending optical fibers 60 and 62) with the same benefit of making the coupling more efficient and/or reducing the size (i.e., reducing the core diameter) of the receiving optical fibers 66 and 64 in FIG. 4.

Figure 6:
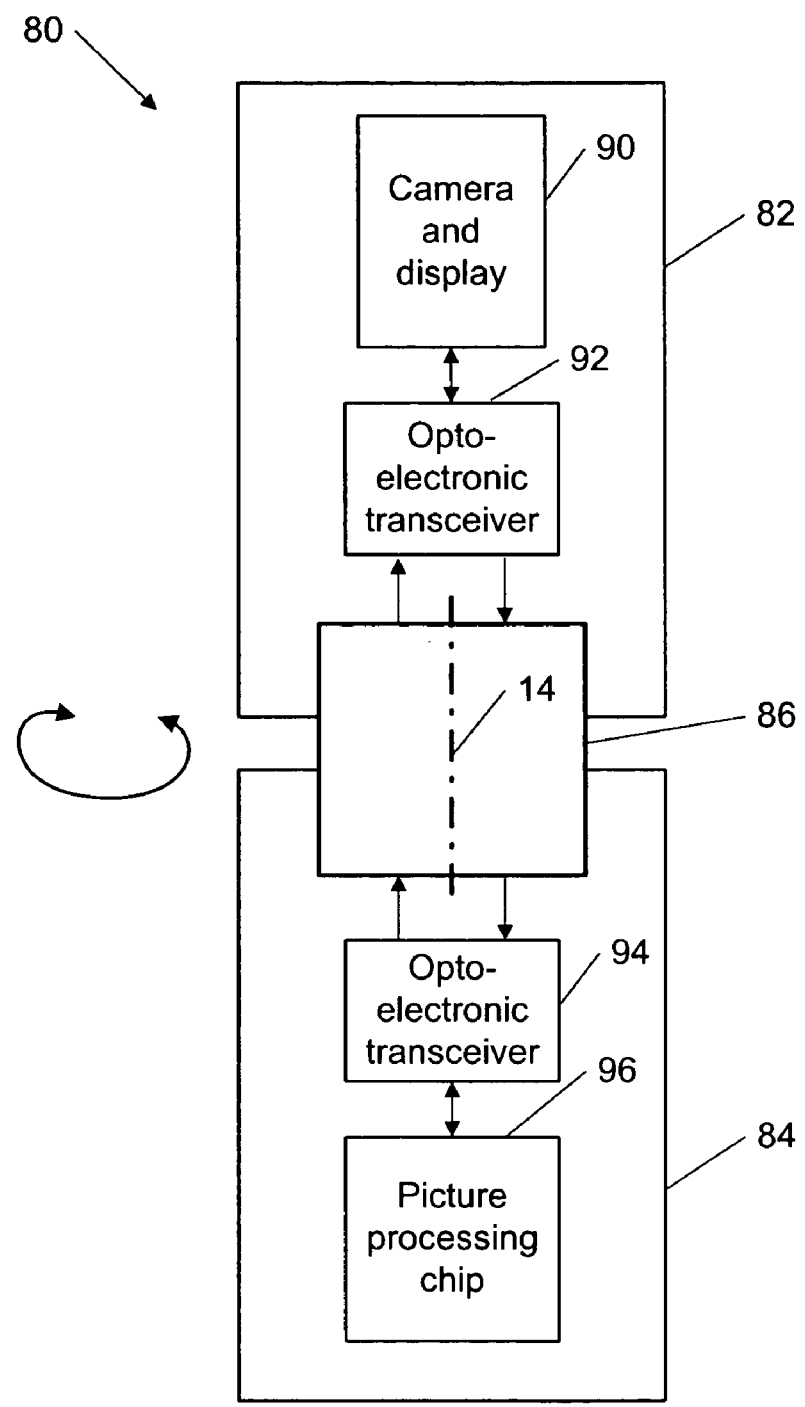
FIG. 6 is a schematic representation of an electronic device incorporating an optical rotary hinge for a bi-directional (two-channel) transmission, according to an embodiment of the present invention.

FIG. 6 shows an example among many others of a schematic representation of an electronic device 80 incorporating an optical rotary hinge 86 for a bi-directional (two-channel) transmission, according to an embodiment of the present invention. The electronic device 80 comprises two parts 82 and 84 which can rotate (or twist) relatively to each other but rigidly connected to the corresponding two parts of the optical rotary hinge 86 as described above. The part 82 comprises a camera and display module 90 and an opto-electronic transceiver 92 for converting electrical and optical signals back and forth. The block 92 comprises, e.g., a light source for generating an optical signal out of an electric signal containing data from the block 90 and a photo diode for converting an optical signal received through the rotary hinge 14 to the electrical signal provided to the block 90. The part 84 comprises a picture processing block 96 and an opto-electronic transceiver 94 for converting the electrical and optical signals back and forth (similar to the block 92). The block 94 comprises, e.g., a light source for generating an optical signal out of an electrical signal containing data from the block 96 and a photo diode for converting an optical signal received through the rotary hinge 14 to the electrical signal provided to the block 96. The high-speed data is communicated between the blocks 90 and 96 through the optical rotary hinge 14 according to embodiments of the present invention and using electro-optical conversion of the corresponding signals.

It is noted, that the embodiments of the present invention can be used for a flip hinge (rotation angle is limited to +/−180 degrees) or even for a combined flip and twist if the rotary hinge described in various embodiments of the present invention is used twice.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A rotary hinge, comprising:
a first hinge part;
a second hinge part, wherein said first and second hinge parts, being complimentary, have one common rotation axis and can rotate relative to each other in a predefined angular range or without any angular limitation;
at least one sending optical guiding element, permanently attached to one hinge part, the first or the second hinge part, off-axis of said common rotation axis, so said at least one sending optical guiding element can rotate around said common rotation axis, wherein an optical beam comprising said optical signal is directed by the at least one sending optical guiding element substantially towards the common rotation axis; and
at least one receiving optical guiding element, permanently attached to a complimentary hinge part of said one hinge part, the second or the first hinge part, respectively, wherein an optical axis of the at least one receiving optical guiding element coincides with the common rotation axis, wherein the optical beam comprising the optical signal is coupled from the at least one sending optical guiding element to the at least one receiving optical guiding element using a predetermined coupling mechanism with substantially the same loss for any angular position of the first and the second hinge parts relative to each other.

2. The rotary hinge of claim 1, wherein said rotary hinge for transmitting an optical signal is configured to provide a bi-directional optical transmission through the rotary hinge.

3. The rotary hinge of claim 1, wherein said predefined angular range is from zero to an angle $\alpha$, wherein $0 < \alpha \leq 360°$.

4. The rotary hinge of claim 1, wherein the at least one sending optical guiding element is a sending optical fiber.

5. The rotary hinge of claim 4, wherein the optical beam comprising the optical signal is coupled out of said sending optical fiber towards the common rotation axis through an angled-cut out-coupling facet of the sending optical fiber, such that the out-coupling facet of the sending optical fiber is not perpendicular to a longitudinal axis of the sending optical fiber; wherein said out-coupling is performed: a) by refraction on a fiber-air interface using a total internal reflection, or b) by a reflecting mirror deposited on the angled-cut out-coupling facet.

6. The rotary hinge of claim 5, wherein an angle between a perpendicular to the angled-cut out-coupling facet and the longitudinal axis of the sending optical fiber is substantially between 45 and 70 degrees.

7. The optic rotary hinge of claim 5, wherein the longitudinal axis of the sending optical fiber is parallel to the common rotation axis.

8. The rotary hinge of claim 4, wherein the sending optical fiber is bent towards the common rotation axis in order to direct the optical beam comprising the optical signal towards the common rotation axis.

9. The rotary hinge of claim 1, wherein an optical index matching fluid is used to fill an air gap between the at least one sending optical guiding element and the at least one receiving optical guiding element to minimize an air-interface reflection on coupling facets of said optical guiding elements.

10. The rotary hinge of claim 1, wherein the at least one receiving optical guiding element is a receiving optical fiber.

11. The rotary hinge of claim 1, wherein said optical beam is collected by the at least one receiving optical guiding element using an in-coupling facet of the at least one receiving optical guiding element implemented as one of:
    a) a lens;
    b) a flat surface;
    c) a conical or curved surface; and
    d) a reverse conical or curved surface.

12. The rotary hinge of claim 1, wherein the optical beam is coupled out by the at least one sending optical guiding element using one of:
    a) an angled-cut out-coupling facet of the at least one sending optical guiding element;
    b) bending the at least one sending optical guiding element towards the common rotation axis in order to direct said beam towards the common rotation axis; and
    c) forming a curved mirror surface or a lensed surface on an out-coupling facet of the at least one sending optical guiding element.

13. The rotary hinge of claim 1, wherein a coupling facet of the at least one receiving optical guiding element or the at least one sending optical guiding element is coated with an antireflection coating for reducing reflection losses.

14. The rotary hinge of claim 1, wherein the at least one sending optical guiding element or the at least one receiving optical guiding element is a light guide.

15. The rotary hinge of claim 1, wherein the optical signal comprises at least one of:
    optical data; and
    visible, infrared or ultraviolet light for illumination.

16. The rotary hinge of claim 1, wherein said one common rotation axis is perpendicular to a boundary between the first hinge part and the second hinge part.

17. A method, comprises:
    coupling the optical signal into at least one sending optical guiding element for transmitting an optical signal through a rotary hinge, wherein said rotary hinge comprises a first hinge part and a second hinge part, wherein said first and second hinge parts, being complimentary, have one common rotation axis and can rotate relative to each other in a predefined angular range or without any angular limitation and wherein the at least one sending optical guiding element is permanently attached to one hinge part, the first or the second hinge part, off-axis of said common rotation axis, so said at least one sending optical guiding element can rotate around said common rotation axis;
    coupling an optical beam comprising said optical signal out of said at least one sending optical guiding element, such that the optical beam is directed by the at least one sending optical guiding element substantially towards the common rotation axis; and
    collecting the optical beam comprising the optical signal coupled out of the at least one sending optical guiding element by the at least one receiving optical guiding element using a predetermined coupling mechanism with substantially the same loss for any angular position of the first and the second hinge parts relative to each other,
    wherein the at least one receiving optical guiding element is permanently attached to a complimentary hinge part of said one hinge part, the second or the first hinge part, respectively, and an optical axis of the at least one receiving optical guiding element coincides with the common rotation axis.

18. The method of claim 17, wherein said predefined angular range is from zero to an angle $\alpha$, wherein $0<\alpha \leqq 360°$.

19. The method of claim 17, wherein the at least one sending or receiving optical guiding element is an optical fiber or a light guide.

20. The method of claim 17, wherein an optical index matching fluid is used to fill an air gap between the at least one sending optical guiding element and the at least one receiving optical guiding element to minimize an air-interface reflection on coupling facets of said optical guiding elements.

21. The method of claim 17, wherein said optical beam is collected by the at least one receiving optical guiding element using an in-coupling facet of the at least one receiving optical guiding element implemented as one of:
    a) a lens;
    b) a flat surface;
    c) a conical or curved surface; and
    d) a reverse conical or curved surface.

22. The method of claim 17, wherein the optical beam is coupled out by the at least one sending optical guiding element using one of:
    a) an angled-cut out-coupling facet of the at least one sending optical guiding element;
    b) bending the at least one sending optical guiding element towards the common rotation axis in order to direct said beam towards the common rotation axis; and
    c) forming a curved mirror surface or a lensed surface on an out-coupling facet of the at least one sending optical guiding element.

23. The method of claim 17, wherein a coupling facet of the at least one receiving optical guiding element or the at least one sending optical guiding element is coated with an antireflection coating for reducing reflection losses.

24. The method of claim 17, wherein the optical signal comprises at least one of:
    optical data; and
    visible, infrared or ultraviolet light for illumination.

25. An electronic device, comprising:
    a first part;
    a second part;
    at least one light source incorporated in said first or said second part of the electronic device, for providing an optical signal;
    a rotary hinge for transmitting said optical signal, which comprises:
        a first hinge part attached to said first part of the electronic device;
        a second hinge part attached to said second part of the electronic device, wherein said first and second hinge parts, and therefore the first and the second part of the electronic device, being complimentary, have one common rotation axis and can rotate relative to each other in a predefined angular range or without an angular limitation;

at least one sending optical guiding element, permanently attached to one hinge part, the first or the second hinge part, off-axis of said common rotation axis, so said at least one sending optical guiding element can rotate around said common rotation axis, wherein said optical signal is coupled to said at least one sending optical guiding element and then an optical beam comprising said optical signal is directed by the at least one sending optical guiding element substantially towards the common rotation axis; and at least one receiving optical guiding element, permanently attached to a complimentary hinge part of said one hinge part, the second or the first hinge part, respectively, wherein an optical axis of the at least one receiving optical guiding element coincides with the common rotation axis, wherein the optical beam comprising the optical signal is coupled from the at least one sending optical guiding element to the at least one receiving optical guiding element using a predetermined coupling mechanism with substantially the same loss for any angular position of the first and the second hinge parts relative to each other.

26. The electronic device of claim 25, wherein said predefined angular range is from zero to an angle $\alpha$, wherein $0 < \alpha \leqq 360°$.

27. The electronic device of claim 25, wherein the at least one sending or receiving optical guiding element is an optical fiber or a light guide.

28. The electronic device of claim 25, wherein said optical beam is collected by the at least one receiving optical guiding element using an in-coupling facet of the at least one receiving optical guiding element implemented as one of:
   a) a lens;
   b) a flat surface;
   c) a conical or curved surface; and
   d) a reverse conical or curved surface.

29. The electronic device of claim 25, wherein the optical beam is coupled out by the at least one sending optical guiding element using one of:

a) an angled-cut out-coupling facet of the at least one sending optical guiding element;
b) bending the at least one sending optical guiding element towards the common rotation axis in order to direct said beam towards the common rotation axis; and
c) forming a curved mirror surface or a lensed surface on an out-coupling facet of the at least one sending optical guiding element.

30. The electronic device of claim 25, wherein the optical signal comprises at least one of:
   optical data; and
   visible, infrared or ultraviolet light for illumination.

31. A rotary hinge, comprising:
   a first hinge part;
   a second hinge part, wherein said first and second hinge parts, being complimentary, have one common rotation axis and can rotate relative to each other in a predefined angular range or without any angular limitation;
   sending means, permanently attached to one hinge part, the first or the second hinge part, off-axis of said common rotation axis, so said at least one sending optical guiding element can rotate around said common rotation axis, wherein an optical beam comprising said optical signal is directed by the at least one sending optical guiding element substantially towards the common rotation axis; and
   receiving means, permanently attached to a complimentary hinge part of said one hinge part, the second or the first hinge part, respectively, wherein an optical axis of the at least one receiving optical guiding element coincides with the common rotation axis, wherein the optical beam comprising the optical signal is coupled from the at least one sending optical guiding element to the at least one receiving optical guiding element using a predetermined coupling mechanism with substantially the same loss for any angular position of the first and the second hinge parts relative to each other.

32. The rotary hinge of claim 31, wherein said sending means is at least one sending optical guiding element, and said receiving means is at least one receiving optical guiding element.

* * * * *